United States Patent
Sip

(10) Patent No.: US 9,411,368 B2
(45) Date of Patent: Aug. 9, 2016

(54) EXTERNAL MODULE, ELECTRONIC DEVICE AND METHOD FOR DRIVING EXTERNAL MODULE

(75) Inventor: Kim Yeung Sip, New Taipei (TW)

(73) Assignee: Acer Incorporated, New Taipei (TW)

(*) Notice: Subject to any disclaimer, the term of this patent is extended or adjusted under 35 U.S.C. 154(b) by 1085 days.

(21) Appl. No.: 13/528,834

(22) Filed: Jun. 21, 2012

(65) Prior Publication Data

US 2013/0057066 A1 Mar. 7, 2013

(30) Foreign Application Priority Data

Sep. 6, 2011 (TW) .............................. 100132135 A

(51) Int. Cl.
*G06F 1/16* (2006.01)
(52) U.S. Cl.
CPC ................ *G06F 1/1632* (2013.01); *G06F 1/16* (2013.01); *Y10T 307/25* (2015.04)
(58) Field of Classification Search
CPC ........ G06F 1/1632; G06F 1/16; Y10T 307/25
USPC ............................ 307/112–113, 149; 439/639
See application file for complete search history.

(56) References Cited

U.S. PATENT DOCUMENTS

| | | | | |
|---|---|---|---|---|
| 4,905,230 A * | 2/1990 | Madge et al. | ................. | 370/222 |
| 5,359,540 A * | 10/1994 | Ortiz | ............................. | 700/295 |
| 6,435,904 B1 * | 8/2002 | Herbst et al. | .................. | 439/534 |
| 6,786,743 B2 * | 9/2004 | Huang | ........................... | 439/131 |
| 7,066,767 B2 * | 6/2006 | Liao | ........................ | H01R 27/02 |
| | | | | 439/13 |
| 7,121,852 B2 * | 10/2006 | Ng et al. | ........................ | 439/131 |
| 7,255,582 B1 * | 8/2007 | Liao | ............................... | 439/165 |
| 7,494,349 B1 * | 2/2009 | Huang | .................... | H01R 27/00 |
| | | | | 439/131 |
| 7,540,748 B2 * | 6/2009 | Tracy | .................... | G01R 1/1616 |
| | | | | 439/131 |
| 7,679,901 B2 * | 3/2010 | Lin | ........................ | G06F 1/1616 |
| | | | | 312/223.1 |
| 7,811,102 B2 * | 10/2010 | Lai | ........................ | G06F 1/1616 |
| | | | | 361/679.55 |
| 7,899,970 B2 * | 3/2011 | Mori | ............................. | 710/313 |
| 7,909,624 B2 * | 3/2011 | Iida | ............................. | 439/131 |
| 8,500,492 B2 * | 8/2013 | Brown et al. | .................. | 439/638 |
| 2003/0177294 A1 * | 9/2003 | Russell | ........................... | 710/62 |
| 2008/0194119 A1 * | 8/2008 | Mori | ............................. | 439/13 |
| 2008/0200064 A1 * | 8/2008 | Chong et al. | .................... | 439/571 |
| 2008/0268678 A1 * | 10/2008 | Hsu | ................. | 439/131 |
| 2010/0013580 A1 * | 1/2010 | Parker et al. | .................. | 335/167 |
| 2010/0165569 A1 * | 7/2010 | Lai | ........................ | G06F 1/1616 |
| | | | | 361/679.55 |
| 2011/0062780 A1 * | 3/2011 | Verges et al. | .................... | 307/38 |
| 2011/0244728 A1 * | 10/2011 | Chang et al. | .................. | 439/628 |
| 2011/0264828 A1 * | 10/2011 | Zeung et al. | .................... | 710/16 |
| 2012/0042099 A1 * | 2/2012 | Wong et al. | ....................... | 710/9 |

* cited by examiner

*Primary Examiner* — Adi Amrany
(74) *Attorney, Agent, or Firm* — Jianq Chyun IP Office

(57) ABSTRACT

An external module, an electronic device and a method for driving an electronic module are provided. The electronic device includes a host and multiple external modules. The external module adapted to be removably connected to the electronic device includes a body, a first connector, a moving assembly and a second connector. The body has multiple connecting ports. The first connector is fixed on one of the connecting ports. The electronic device is adapted to be electrically connected to the first connector for providing power to the external module to drive the moving assembly. The second connector is assembled to the moving assembly disposed in the body and electrically connected to the first connector. The moving assembly drives the second connector to switch between the connecting ports, and the connecting port where the second connector is located is different from the connecting port where the first connector is located.

16 Claims, 4 Drawing Sheets

EXTERNAL MODULE, ELECTRONIC DEVICE AND METHOD FOR DRIVING EXTERNAL MODULE

CROSS-REFERENCE TO RELATED APPLICATION

This application claims the priority benefit of Taiwan application Ser. No. 100132135, filed on Sep. 6, 2011. The entirety of the above-mentioned patent application is hereby incorporated by reference herein and made a part of this specification.

BACKGROUND OF THE INVENTION

1. Field of the Invention

The present invention relates to an external module, and more particularly, to an external module having a movable connector.

2. Description of Related Art

With the development of technology, computers nowadays are more and more widely used and the computer functions have also been more and more versatile. In order to quickly and conveniently increase the computer performance or add the computer function, a computer host typically includes a bus expansion portion, such as, AGP bus slots, PCI bus slots, USB expansion pin sets, or Thunderbolt bus slots.

In general, the host has already been equipped with multiple bus connectors for connecting peripherals such as a mouse, a printer, a scanner or an external hard disk. However, not all bus connectors can satisfy the current needs of the users. Therefore, as the computer peripherals become more and more versatile, users may often face the situation that the host has not provided enough bus connectors, or the bus connectors already provided by the host are not used thus causing a waste. What is needed, therefore, is a device or method which takes full advantage of the bus connectors or allows the bus connectors to vary according to need.

SUMMARY OF THE INVENTION

Accordingly, the present invention is directed to an external module that can be freely connected in series with one another and electrically connected to an electronic device.

The present invention provides an external module adapted to be removably connected to an electronic device. The external module includes a body, a first connector, a moving assembly and a second connector. The body has a plurality of connecting ports. The first connector is fixed on one of the connecting ports. The electronic device is adapted to be electrically connected to the first connector for providing power to the external module. The moving assembly is disposed in the body. The second connector is assembled to the moving assembly and electrically connected to the first connector. The moving assembly drives the second connector to switch between the connecting ports, and the connecting port where the second connector is located is different from the connecting port where the first connector is located.

The present invention provides an electronic device comprising a host and a plurality of external modules. The external modules are connected in series with the host. Each of the external modules includes a body, a first connector, a moving assembly, and a second connector. The first connector is disposed in the body and electrically connected to the host or another external module. The moving assembly is disposed in the body. A second connector is disposed on the moving assembly and electrically connected to the first connector. The host is adapted to deliver power to the external modules to drive the moving assembly such that the second connector moves to another position and is connected to the first connector of another external module.

The present invention provides a method for driving an external module. The external module is adapted to be externally connected to an electronic device. The external module includes a body, a moving assembly, a first connector and a second connector. The body has a plurality of connecting ports. The first connector is fixed on one of the connecting ports. The moving assembly drives the second connector to switch between the connecting ports, and the connecting port where the second connector is located being different from the connecting port where the first connector is located. The method comprises providing power to the moving assembly by the electronic device upon the first connector being connected to the electronic device; and inputting a position of one of the connecting ports into the electronic device to drive the moving assembly to rotate the second connector to the connecting port.

According to an embodiment of the present invention, the moving assembly described above further includes a rotating axle, a cantilever and a driving unit. The rotating axle is disposed in the body. An end of the cantilever is connected to a center of the rotating axle. The second connector is disposed on another end of the cantilever. The driving unit is connected to the rotating axle to drive the rotating axle and the cantilever to rotate.

According to an embodiment of the present invention, the rotating axle described above is a gear. The driving unit includes an electromagnetic assembly and a rack. The electromagnetic assembly includes a movable magnetic member and a plurality of coils surrounding the movable magnetic member. The rack is connected to the movable magnetic member and meshes with the rotating axle. The coils are adapted to receive power to drive the movable magnetic member to push the rack back-and-forth, thereby rotating the rotating axle and the cantilever.

According to an embodiment of the present invention, the body described above has two different receiving spaces. The first connector is disposed in one of the two receiving spaces. The cantilever and the second connector rotate in the other receiving space.

According to an embodiment of the present invention, the external module described above further includes a circuit board. The circuit board and the first connector are commonly located in the same receiving space. The circuit board is electrically connected to the first connector, the second connector and the driving unit.

According to an embodiment of the present invention, the contour of the circuit board is a semi-circle. The edge of the circuit board is positioned at the border of the two receiving spaces. The rotating axle is positioned at the centric of the circuit board.

According to an embodiment of the present invention, the moving assembly described above further includes a stopper disposed on the cantilever. When the cantilever rotates to the edge of the circuit board, the stopper interferences with the circuit board.

According to an embodiment of the present invention, the body described above further includes a plurality of flexible positioning members located beside the connecting ports respectively and on a rotating path of the second connector to position the second connector on the respective connecting ports.

According to an embodiment of the present invention, the moving assembly includes a driving unit and a linkage connected to each other. The driving unit includes an electromagnetic assembly. The second connector is disposed on the linkage. The method described above further comprises based on the inputted position of the connecting port, delivering a corresponding current to the electromagnetic assembly by the electronic device to drive the cantilever to rotate an angle so as to move the second connector to the connecting port.

According to an embodiment of the present invention, the method described above further comprises based on the inputted position of the connecting port, delivering a corresponding current to the resilient member by the electronic device, such that the resilient member receives the current to extend or telescope to drive the cantilever to rotate an angle so as to move the second connector to the connecting port.

In view of the foregoing, in the present invention, a moving assembly is disposed in an external module with a plurality of connecting ports. The moving assembly drives a rotatable second connector to switch between the plurality of connecting ports. The external module further includes a fixed first connector that can be connected to an electronic device to deliver power to the external module. As such, the position of the second connector of the external module can be switched freely, which increases the convenience and flexibility in using the external modules. In addition, since in the present invention the first connector and the second connector may be used to connect multiple external modules with different functions in series with an electronic device, the present invention satisfactorily addresses the problem of the insufficient amount of connecting ports of the electronic device.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
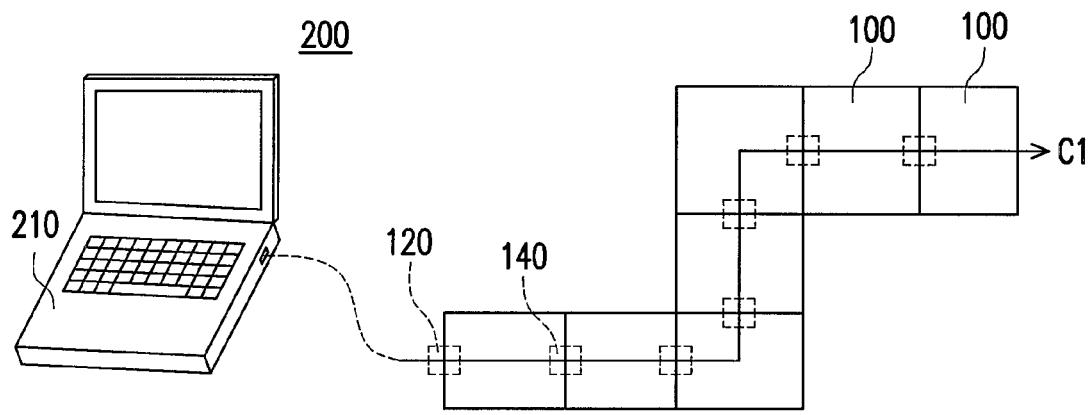
FIG. 1 illustrates an electronic device according to one embodiment of the present invention.

FIG. 1 illustrates an electronic device according to one embodiment of the present invention. Referring to FIG. 1, the electronic device 200 of the present embodiment includes a host 210 and a plurality of external modules 100. The electronic device 200 may be a notebook computer, a desktop computer, a tablet or a host system with independent computing and displaying functions. Each external module 100 is an electronic module having a specific function which acts as an extension kit of this electronic device 200, such as, a TV box, a blu-ray player, a speaker system or the like. In addition, the external modules 100 can expand peripheral functions of the electronic device 200 as well as increase the value and convenience of using the electronic device 200.

A notebook computer is described herein for the purposes of illustration only. The notebook computer is connected in series with the external modules 100 to form an electrical series-connection path C1. Here, each external module 100 may be modified and changed according to needs.

Figure 2:
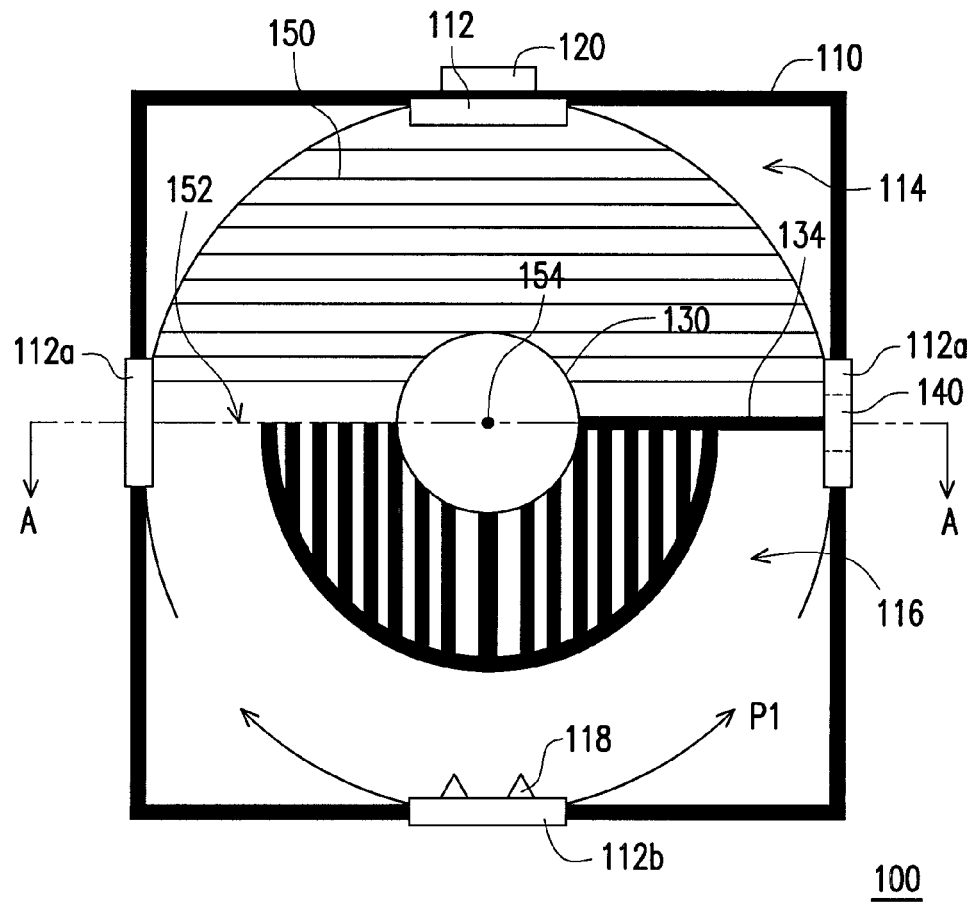
FIG. 2 is a perspective view of the external module of FIG. 1

FIG. 2 is a perspective view of the external module of FIG. 1 which more clearly shows the interior structure of the external module 100. Referring to FIG. 2, the external module 100 of the present embodiment includes a body 110, a first connector 120, a moving assembly 130, a second connector 140, and a circuit board 150. One of the first connector 120 and the second connector 140 may be a plug, and the other may be a socket. In this embodiment, the first connector 120 is a plug and the second connector 140 is a socket. The body 110 has a first receiving space 114, a second receiving space 116, a first connecting port 112, and a plurality of second connecting ports 112a, 112b. The first connecting port 112 and the first connector 120 are disposed in the first receiving space 114, with the first connector 120 fixed to the first connecting port 112. The electronic device 200 is adapted to be electrically connected to the first connector 120 to provide power to the external modules 100.

The moving assembly 130 is disposed in the body 110. The second connector 140 is assembled to the moving assembly 130 and electrically connected with the first connector 120. The moving assembly 130 rotates in the second receiving space 116 to drive the second connector 140 to switch between the second connecting port 112a and the second connecting port 112b. The circuit board 150 is disposed in the first receiving space 114 and electrically connected between the first connector 120 and the second connector 140. In the present embodiment, the circuit board 150 is in semi-circular shape. The circuit board 150 has an edge 152 located on a junction of the first receiving space 114 and the second receiving space 116 to cooperate with the moving assembly 130 so as to result in a better space utilization rate of the circuit board 150 in the interior of the body 110. As shown herein in FIG. 2, the second connecting port adjacent to the edge 152 is labelled as 112a, whereas the second connecting port not adjacent to the edge 152 is labelled as 112b. However, the number of the second connecting ports of the body should not be limited to the specific number illustrated herein and can suitably vary according to the outer profile of the body 110.

Figure 3A:
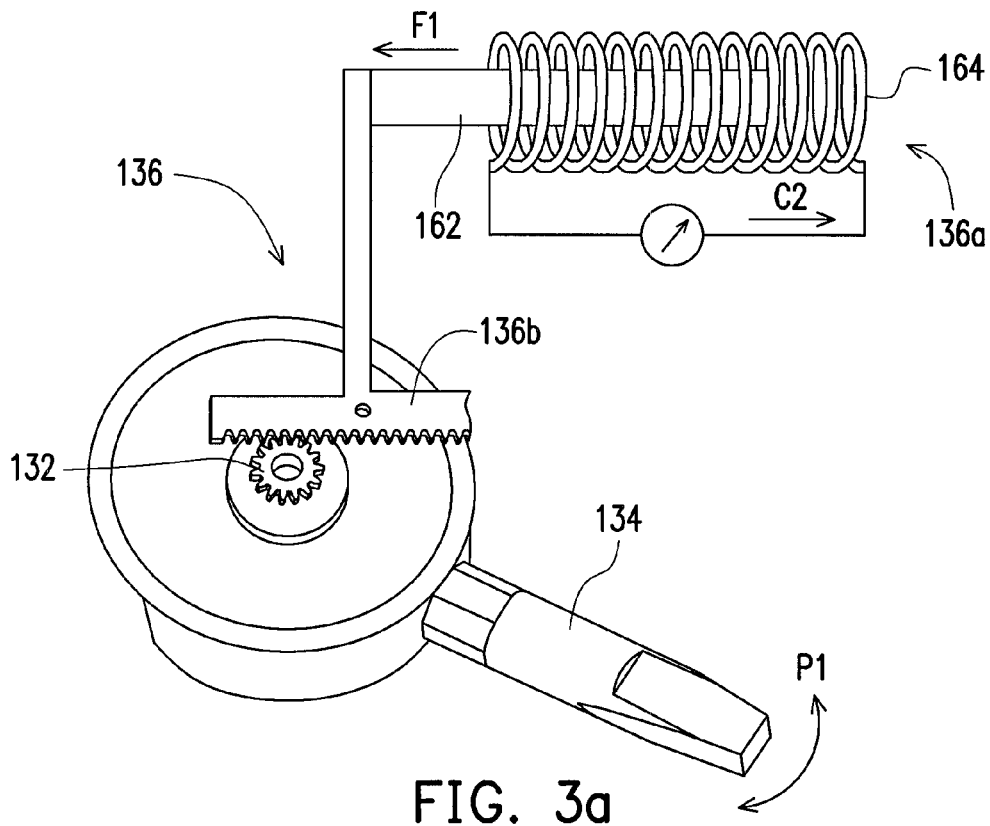
FIG. 3a illustrates a driving unit of FIG. 2.
Figure 3B:
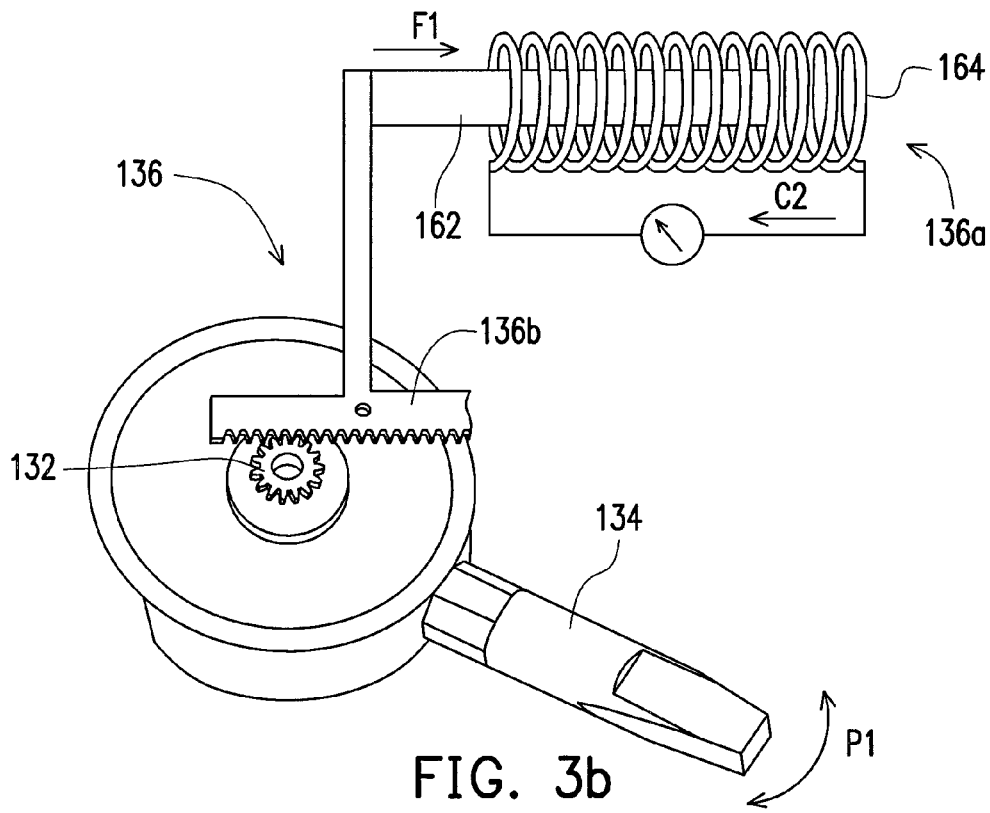
FIG. 3b illustrates another state of the driving unit of FIG. 2.

FIG. 3a illustrates a driving unit of FIG. 2, and FIG. 3b illustrates another state of the driving unit of FIG. 2. Referring to FIG. 3a and FIG. 3b, specifically, the moving assembly 130 includes a rotating axle 132, a cantilever 134, and a driving unit 136. The rotating axle 132 has a circular teeth feature (i.e. the rotating axle 132 is substantially a gear wheel) which is located on a center 154 of the circuit board 150. One end of the cantilever 134 is connected to a center of the rotating axle 132, and the second connector 140 is disposed on another end of the cantilever 134 (not shown). The driving unit 136 includes an electromagnetic assembly 136a and a rack 136b. The electromagnetic assembly 136a includes a movable magnetic member 162 and a plurality of coils 164 surrounding the magnetic member 162. The movable magnetic member 162 is connected to the rack 136b which meshes with the rotating axle 132.

The driving unit 136 is electrically connected with the circuit board 150 to thereby deliver the power of the host 210 to the coils 164. As such, under the electromagnetic effect, a current C2 on the coils 164 produces a magnetic force F1 for driving the movable magnetic member 162 to move, so as to push the rack 136 to drive the rotating axle 132 to rotate along a rotating path P1. Therefore, the user can control the rotating direction and rotating angle of the second connector 140 by means of the direction and magnitude of the current C2 on the coils 164, such that the location of the second connector 140 can be switched between different connecting ports 112a, 112b.

Figure 3C:
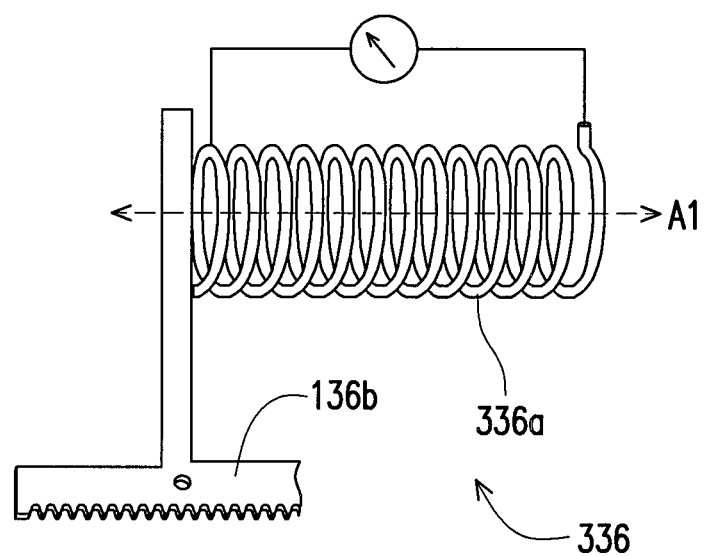
FIG. 3c illustrates a driving unit of an external module according to another embodiment of the present invention.

FIG. 3c illustrates a driving unit of an external module according to another embodiment of the present invention. Referring to FIG. 3c, different from the embodiment described above, the driving unit 336 includes a resilient member 336a (e.g. a conductive telescopic spring) and a rack 136b. The rack 136b meshes with the rotating axle 132, which is similar to the rack in the above embodiment and therefore is not repeated herein. Differently, one end of the resilient member 336a is connected to the rack 136b, and the resilient member 336a is adapted to receive a current to telescope or extend along an axial direction A1. As such, providing a current to the resilient member 336a can cause the resilient member 336a to telescope or extend so as to drive the rack 136b to move back-and-forth, thereby causing the rack 136b to drive the rotating axle 132 to rotate back-and-forth as in the above embodiment.

Figure 4:
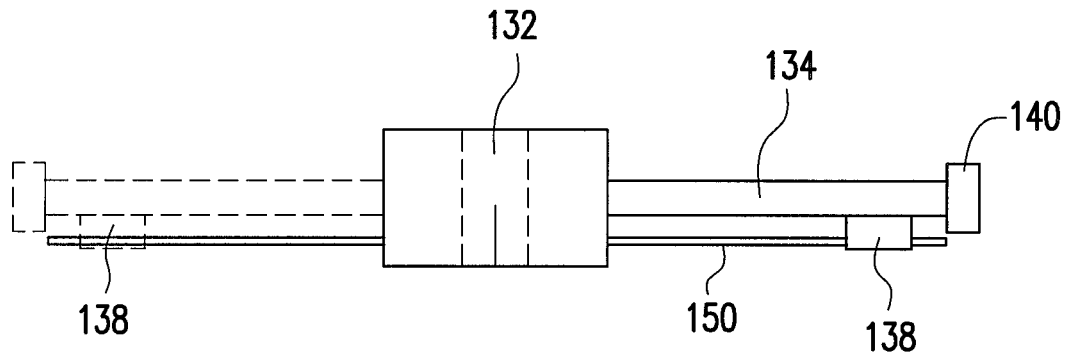
FIG. 4 is a cross-sectional view taken along line A-A in FIG. 2.

FIG. 4 is a cross-sectional view taken along line A-A in FIG. 2. Referring to FIG. 2 and FIG. 4, specifically, the moving assembly 130 further includes a stopper 138 disposed on the cantilever 134. When the cantilever 134 rotates to the edge 152 of the circuit board 150, the stopper 138 and the circuit board 150 physically interference thus preventing the cantilever 134 from rotating further toward the circuit board 150, such that the second connector 140 is positioned at the second connecting port 112a shown in FIG. 2. In addition, the body 110 further includes a plurality of flexible positioning members 118 made of, for example, rubber. The flexible positioning members 118 are located on the opposite sides of the second connecting port 112b that is not adjacent the edge 152 and located on the rotating path P1 of the second connector 140 so as to position the second connector 140 on the second connecting port 112b.

Figure 5:
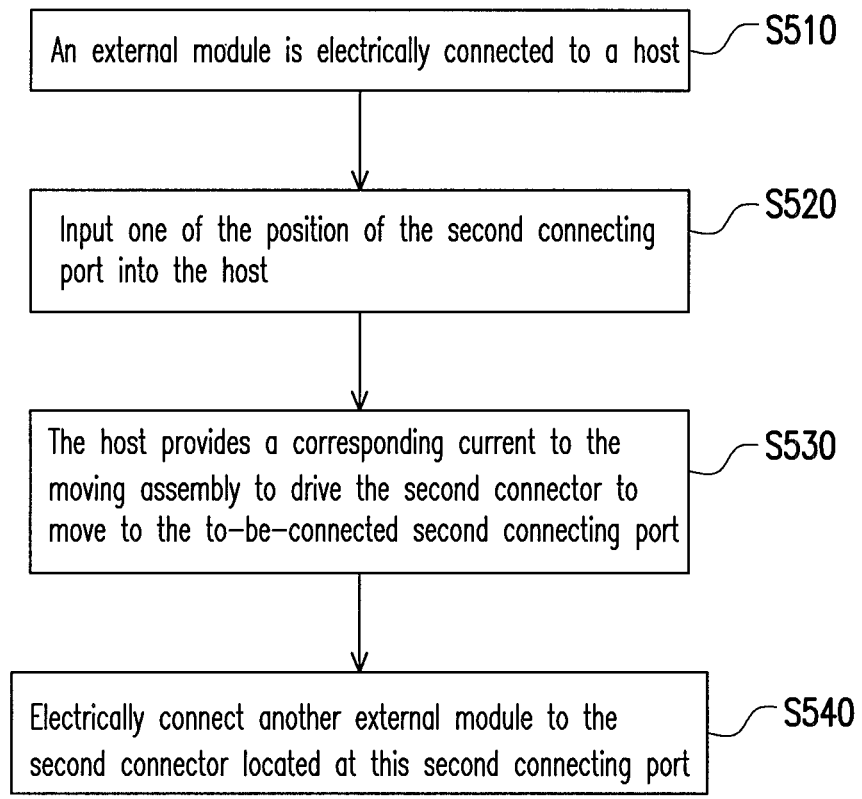
FIG. 5 is a flow chart of a method for driving an external module according to one embodiment of the present invention.

FIG. 5 is a flow chart of a method for driving an external module according to one embodiment of the present invention. Referring to FIG. 5, when the user desires to drive the external module 100, the external module 100 is electrically connected to the host 210 at step S510, such that, at this time, the host 210 can deliver power to the circuit board 150. At step S520, the user needs to input a position of one of the second connecting ports 112a, 112b to the host 210. At step S530, the host 210 determines rotating angle and direction of the moving assembly 130 based on the input position and provides a corresponding current to the moving assembly 130 to drive the second connector 140 to move to the to-be-connected second connecting port 112a or 112b. In addition, at step S540, the user may further electrically connect another external module 100 to the second connector 140 located at this second connecting port 112a or 112b, thereby driving the series-connected external modules 100 for the electric device 200 connected thereto to use.

In another embodiment of the present invention not illustrated in figures, the position of the second connector may also be manually controlled. For example, a manual control button may be disposed on the cantilever and at least a portion of the manual control button is exposed from a bottom surface of the body. A rotating rail is formed on the bottom surface, which surrounds the rotating axle and allows the manual control button to rotate with the cantilever along the rotating rail. When the user desires to switch the position of the second connector, the user only needs to press and move the manual control button along the rotating rail to a position where the second connector is electrically connected with the second connecting port.

In summary, in the present invention, a moving assembly is disposed in an external module having a plurality of connecting ports. The moving assembly drives a rotatable second connector to switch between the connecting ports. The external module further includes a fixed first connector that can be connected to an electronic device to provide power to the external module. The external module uses the power provided by the electronic device to drive an electromagnetic assembly of the moving assembly, which in turn drives a rotating axle and a cantilever connected to the second connector to rotate, thereby rotating the second connector to a to-be-connected connecting port to establish an electrical connection. Since the position of the second connector of the external module can be switched freely, a plurality of external modules having different functions can be arranged freely and connected in series. The series-connected external modules can be connected to the electronic device as extension kits of the electronic device. This increases the convenience in using the external modules and the flexibility of combination of the external modules. In addition, since in the present invention only one connector connected to the electronic device is needed to connect multiple external modules to the electronic device at the same time, the present invention satisfactorily addresses the problem of the insufficient amount of connecting ports of the electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An external module adapted to be removably connected to an electronic device, the external module comprises:
   a body having a plurality of connecting ports;
   a first connector fixed on one of the connecting ports;
   a moving assembly comprising:
      a rotating axle disposed in the body;
      a cantilever having one end connected to a center of the rotating axle, a second connector disposed on another end of the cantilever; and
      a driving unit connected to the rotating axle to drive the rotating axle and the cantilever to rotate; and
   the second connector is electrically connected to the first connector, wherein the electronic device is adapted to be electrically connected to the first connector for providing power to the external module to drive the moving assembly causing the second connector to switch between the connecting ports, and the connecting port where the second connector located is different from the connecting port where the first connector is located.

2. The external module according to claim 1, wherein the rotating axle is a gear and the driving unit comprises:
   an electromagnetic assembly comprising a movable magnetic member and a plurality of coils surrounding the movable magnetic member; and
   a rack connected to the movable magnetic member and meshing with the rotating axle, wherein the coils are adapted to receive power to drive the movable magnetic member to push the rack back-and-forth, thereby rotating the rotating axle and the cantilever.

3. The external module according to claim 1, wherein the rotating axle is a gear and the driving unit comprises:

a resilient member; and
a rack meshing with the rotating axle and connected to one end of the resilient member, wherein the resilient member is adapted to receive power to extend or telescope to drive the rack back-and-forth so as to drive the rotating axle and the cantilever to rotate.

4. The external module according to claim 1, wherein the body has two different receiving spaces, the external module comprises a circuit board electrically connected to the first connector, the second connector and the driving unit, the circuit board and the first connector are located in one of the receiving spaces, and the cantilever and the second connector rotate in the other receiving space.

5. The external module according to claim 4, wherein the moving assembly further comprises a stopper disposed on the cantilever, and when the cantilever rotates to the edge of the circuit board, the stopper interferences with the circuit board.

6. The external module according to claim 1, wherein the body further comprises a plurality of flexible positioning members located beside the connecting ports respectively and on a rotating path of the second connector to position the second connector on the respective connecting ports.

7. An electronic device comprising:
a host;
a plurality of external modules connected in series with the host, each of the external modules comprising:
a body;
a first connector disposed in the body and electrically connected to the host or another external module;
a moving assembly comprising:
a rotating axle disposed in the body;
a cantilever having one end connected to a center of the rotating axle, a second connector disposed on another end of the cantilever; and
a driving unit connected to the rotating axle to drive the rotating axle and the cantilever to rotate; and
the second connector is electrically connected to the first connector, wherein the host is adapted to deliver power to the external modules to drive the moving assembly such that the second connector moves to a position and is connected to the first connector of another external module.

8. The electronic device according to claim 7, wherein the body has a plurality of connecting ports, the first connector is fixed to one of the connecting ports, and the second connector is switched between the rest of the connecting ports.

9. The electronic device according to claim 8, wherein the body further comprises a plurality of flexible positioning members located beside the connecting ports respectively and on a rotating path of the second connector to position the second connector on the respective connecting ports.

10. The electronic device according to claim 7, wherein the rotating axle is a gear and the driving unit comprises:
an electromagnetic assembly comprising a movable magnetic member and a plurality of coils surrounding the movable magnetic member; and
a rack connected to the movable magnetic member and meshing with the rotating axle, wherein the coils are adapted to receive power to drive the movable magnetic member to push the rack back-and-forth, thereby rotating the rotating axle and the cantilever.

11. The electronic device according to claim 7, wherein the rotating axle is a gear and the driving unit comprises:
a resilient member; and
a rack meshing with the rotating axle and connected to one end of the resilient member, wherein the resilient member is adapted to receive power to extend or telescope to drive the rack back-and-forth so as to drive the rotating axle and the cantilever to rotate.

12. The electronic device according to claim 7, wherein the body has two different receiving spaces, the external module comprises a circuit board electrically connected to the first connector, the second connector and the driving unit, the circuit board and the first connector are located in one of the receiving spaces, and the cantilever and the second connector rotate in the other receiving space.

13. The electronic device according to claim 12, wherein the moving assembly further comprises a stopper disposed on the cantilever, and when the cantilever rotates to the edge of the circuit board, the stopper interferences with the circuit board.

14. A method for driving an external module, the external module adapted to be externally connected to an electronic device, the external module comprising a body, a moving assembly, a first connector and a second connector, the body having a plurality of connecting ports, the first connector fixed on one of the connecting ports, the moving assembly comprising a rotating axle disposed in the body and with a circular teeth feature, a cantilever having one end connected to a center of the rotating axle and a driving unit connected to the rotating axle to drive the rotating axle and the cantilever to rotate, the second connector disposed on another end of the cantilever, the moving assembly driving the second connector to switch between the connecting ports, and the connecting port where the second connector is located being different from the connecting port where the first connector is located, the method comprising:
providing power to the moving assembly by the electronic device upon the first connector being connected to the electronic device; and
inputting an input signal to the electronic device to drive the moving assembly to rotate the second connector to one of the connecting ports, wherein the input signal is related to a position of the one of the connecting ports.

15. The method for driving the external module according to claim 14, wherein the driving unit comprising:
an electromagnetic assembly comprising a movable magnetic member and a plurality of coils surrounding the movable magnetic member; and
a rack connected to the movable magnetic member and meshing with the rotating axle, wherein the coils are adapted to receive power to drive the movable magnetic member to push the rack back-and-forth, thereby rotating the rotating axle and the cantilever;
the method further comprising:
based on the inputted position of the connecting port, delivering a corresponding current to the electromagnetic assembly by the electronic device to drive the cantilever to rotate an angle so as to move the second connector to the connecting port.

16. The method for driving the external module according to claim 14, wherein
the driving unit comprises:
a resilient member; and
a rack meshing with the rotating axle and connected to one end of the resilient member, wherein the resilient member is adapted to receive power to extend or telescope to drive the rack back-and-forth so as to drive the rotating axle and the cantilever to rotate;
the method further comprising:
based on the inputted position of the connecting port, delivering a corresponding current to the resilient member by the electronic device, such that the resilient member receives the current to extend or telescope to drive the cantilever to rotate an angle so as to move the second connector to the connecting port.

* * * * *